United States Patent
Comer et al.

(10) Patent No.: US 9,739,020 B2
(45) Date of Patent: Aug. 22, 2017

(54) APPARATUS AND METHOD FOR A PAVER CONVEYOR

(71) Applicant: Carlson Paving Products, Inc., Tacoma, WA (US)

(72) Inventors: Kevin Comer, Puyallup, WA (US); Robert Bauer, Tacoma, WA (US)

(73) Assignee: Carlson Paving Products, Inc., Tacoma, WA (US)

( * ) Notice: Subject to any disclaimer, the term of this patent is extended or adjusted under 35 U.S.C. 154(b) by 0 days.

(21) Appl. No.: 15/462,196

(22) Filed: Mar. 17, 2017

(65) Prior Publication Data
US 2017/0191231 A1 Jul. 6, 2017

Related U.S. Application Data

(63) Continuation-in-part of application No. 14/333,355, filed on Jul. 16, 2014, now abandoned.

(60) Provisional application No. 61/957,949, filed on Jul. 16, 2013.

(51) Int. Cl.
*E01C 19/12* (2006.01)
*E01C 19/20* (2006.01)

(52) U.S. Cl.
CPC ...... *E01C 19/20* (2013.01); *E01C 2019/2075* (2013.01)

(58) Field of Classification Search
USPC .................................. 404/108, 110; 198/300
IPC .......... E01C 19/002, 19/12, 19/475, 2019/2075
See application file for complete search history.

(56) References Cited

U.S. PATENT DOCUMENTS

| | | | | |
|---|---|---|---|---|
| 3,101,837 A | * | 8/1963 | Martin | B65G 45/16 198/499 |
| 3,987,912 A | * | 10/1976 | Moyano | E04H 6/18 414/239 |
| 4,012,160 A | * | 3/1977 | Parker | E01C 19/4873 404/84.05 |
| 4,405,089 A | * | 9/1983 | Taylor | B60P 1/38 239/656 |
| 5,466,112 A | * | 11/1995 | Feller | B60P 1/16 239/657 |
| 5,857,804 A | * | 1/1999 | Musil | E01C 19/48 404/104 |
| 6,315,105 B1 | * | 11/2001 | Gibbs | B65G 45/12 198/497 |

(Continued)

*Primary Examiner* — Gary Hartmann
(74) *Attorney, Agent, or Firm* — Chambliss, Bahner & Stophel, P.C.

(57) ABSTRACT

A conveyor system adapted for use on an asphalt paver comprising a conveyor system frame, a first pulley that is rotatably mounted to the frame, a second pulley that is rotatably mounted to the frame and spaced apart from the first pulley, and a belt having a pulley-contacting surface and an asphalt-contacting surface and being disposed around the first pulley and the second pulley. The preferred conveyor system also comprises a wiper that is adapted to remove asphaltic material from the asphalt-contacting surface of the belt and a means for rotating the first pulley that is adapted to rotate the first pulley. The preferred conveyor system is adapted to convey asphaltic material between a first area adjacent to the second pulley and a second area adjacent to the first pulley. A method for conveying asphaltic material in a paver comprising providing a conveyor system and conveying asphaltic material.

18 Claims, 12 Drawing Sheets

(56) References Cited

U.S. PATENT DOCUMENTS

| | | | | |
|---|---|---|---|---|
| 6,481,925 B1* | 11/2002 | Olson | ............... | E01C 19/48 |
| | | | | 404/101 |
| 6,843,363 B2* | 1/2005 | Schwarze | ............. | B65G 45/16 |
| | | | | 198/497 |
| 7,083,040 B2* | 8/2006 | Finger | ............... | B65G 45/16 |
| | | | | 198/497 |
| 7,819,237 B2* | 10/2010 | Felton | ............... | B65G 45/16 |
| | | | | 198/499 |
| 9,506,204 B2* | 11/2016 | Blank | ............... | E01C 19/002 |
| 2003/0143024 A1* | 7/2003 | Sharpe | ............... | E01C 19/4853 |
| | | | | 404/75 |

\* cited by examiner

APPARATUS AND METHOD FOR A PAVER CONVEYOR

CROSS-REFERENCES TO RELATED APPLICATIONS/PATENTS

This application is a continuation-in-part of U.S. Application for patent Ser. No. 14/333,355, entitled "Apparatus and Method for a Paver Conveyor" and filed on Jul. 16, 2014, which relates back to and claims the benefit of priority from U.S. Provisional Application for Patent Ser. No. 61/957,949 entitled "Apparatus and Method for Paver with Conveyor" and filed on Jul. 16, 2013.

FIELD OF THE INVENTION

The present invention relates generally to conveyor systems, and particularly to conveyor systems adapted to convey asphaltic materials on items of road construction equipment.

BACKGROUND AND DESCRIPTION OF THE PRIOR ART

It is known to use flight bars or slat bars connected to roller chains pulled by a sprocket to convey asphaltic material in pavers. Conventional flight bar and slat bar assemblies, however, suffer from one or more disadvantages. For example, conventional flight bar and slat bar assemblies pull back only a limited amount of asphaltic material. Conventional flight bar and slat bar assemblies also fail to sufficiently reduce or eliminate carry-around asphaltic material with each flight or slat. As a result, conventional flight bar and slat bar assemblies produce asphaltic material build-up under the paver where working components are located. The asphaltic material build-up causes premature failure of the mechanical, hydraulic and track components of the paver. Conventional flight bar and slat bar assemblies also cause asphaltic material to be segregated because the carry-around asphaltic material falls in front of the working head of the asphaltic material. In addition, conventional flight bar and slat bar assemblies are difficult to clean and must be operated at undesirably fast speeds. As a result, conventional flight bar and slat bar assemblies result in undesirable wear on their components and undesirable consumption of costly fuel.

It would be desirable, therefore, if an apparatus and method for a conveyor system adapted for use on an asphalt paver could be provided that would not pull back only a limited amount of asphaltic material. It would also be desirable if such an apparatus and method for a conveyor system adapted for use on an asphalt paver could be provided that would sufficiently reduce or eliminate carry-around asphaltic material. It would be further desirable if such an apparatus and method for a conveyor system adapted for use on an asphalt paver could be provided that would sufficiently reduce or eliminate asphaltic material build-up under the paver where the working components are located. It would be still further desirable if such an apparatus and method for a conveyor system adapted for use on an asphalt paver could be provided that would sufficiently reduce or eliminate the premature failure of the mechanical, hydraulic and track components of the paver. In addition, it would be desirable if such an apparatus and method for a conveyor system adapted for use on an asphalt paver could be provided that would sufficiently reduce or eliminate the segregation of asphaltic material. It would also be desirable if such an apparatus and method for a conveyor system adapted for use on an asphalt paver could be provided that would be easy to clean and could be operated at reduced speeds. It would be further desirable if such an apparatus and method for a conveyor system adapted for use on an asphalt paver could be provided that would sufficiently reduce or eliminate wear on its components and sufficiently reduce the consumption of costly fuel.

Advantages of the Preferred Embodiments of the Invention

Accordingly, it is an advantage of the preferred embodiments of the invention claimed herein to provide an apparatus and method for a conveyor system adapted for use on an asphalt paver that would convey an entire load of asphaltic material and not pull back only a limited amount of a load of asphaltic material. It is also an advantage of the preferred embodiments of the invention claimed herein to provide an apparatus and method for a conveyor system adapted for use on an asphalt paver that sufficiently reduces or eliminates carry-around asphaltic material. It is a further advantage of the preferred embodiments of the invention claimed herein to provide an apparatus and method for a conveyor system adapted for use on an asphalt paver that sufficiently reduces or eliminates asphaltic material build-up under the paver where the working components are located. It is a still further advantage of the preferred embodiments of the invention claimed herein to provide an apparatus and method for a conveyor system adapted for use on an asphalt paver that sufficiently reduces or eliminates the premature failure of the mechanical, hydraulic and track components of the paver. In addition, it an advantage of the preferred embodiments of the invention claimed herein to provide an apparatus and method for a conveyor system adapted for use on an asphalt paver that sufficiently reduces or eliminates the segregation of asphaltic material. It also an advantage of the preferred embodiments of the invention claimed herein to provide an apparatus and method for a conveyor system adapted for use on an asphalt paver that is easy to clean and can be operated at reduced speeds. It is a further advantage of the preferred embodiments of the invention claimed herein to provide an apparatus and method for a conveyor system adapted for use on an asphalt paver that sufficiently reduces or eliminates wear on its components and sufficiently reduces the consumption of costly fuel.

Additional advantages of the preferred embodiments of the invention will become apparent from an examination of the drawings and the ensuing description.

SUMMARY OF THE INVENTION

The apparatus of the invention comprises a conveyor system adapted for use on an asphalt paver. The preferred conveyor system comprises a conveyor system frame, a first pulley that is rotatably mounted to the conveyor system frame, a second pulley that is rotatably mounted to the conveyor system frame and spaced apart from the first pulley, and a belt having a pulley-contacting surface and an asphalt-contacting surface and being disposed around the first pulley and the second pulley. The preferred conveyor system also comprises a wiper that is adapted to remove asphaltic material from the asphalt-contacting surface of the belt and a means for rotating the first pulley that is adapted to rotate the first pulley. The preferred conveyor system is adapted to convey asphaltic material between a first area adjacent to the second pulley and a second area adjacent to the first pulley.

The method of the invention comprises a method for conveying asphaltic material in an asphalt paver. The preferred method comprises providing a conveyor system adapted for use on an asphalt paver. The preferred conveyor system comprises a conveyor system frame, a first pulley that is rotatably mounted to the conveyor system frame, a second pulley that is rotatably mounted to the conveyor system frame and spaced apart from the first pulley, and a belt having a pulley-contacting surface and an asphalt-contacting surface and being disposed around the first pulley and the second pulley. The preferred conveyor system also comprises a wiper that is adapted to remove asphaltic material from the asphalt-contacting surface of the belt and a means for rotating the first pulley that is adapted to rotate the first pulley. The preferred conveyor system is adapted to convey asphaltic material between a first area adjacent to the second pulley and a second area adjacent to the first pulley. The preferred method further comprises conveying asphaltic material between the first area adjacent to the second pulley and a second area adjacent to the first pulley. In other preferred embodiments of the method, the method further comprises removing asphaltic material from the asphalt-contacting surface of the belt with the wiper, tensioning the belt with a tensioning means, and backbending the belt with a backbending means.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Figure 1:
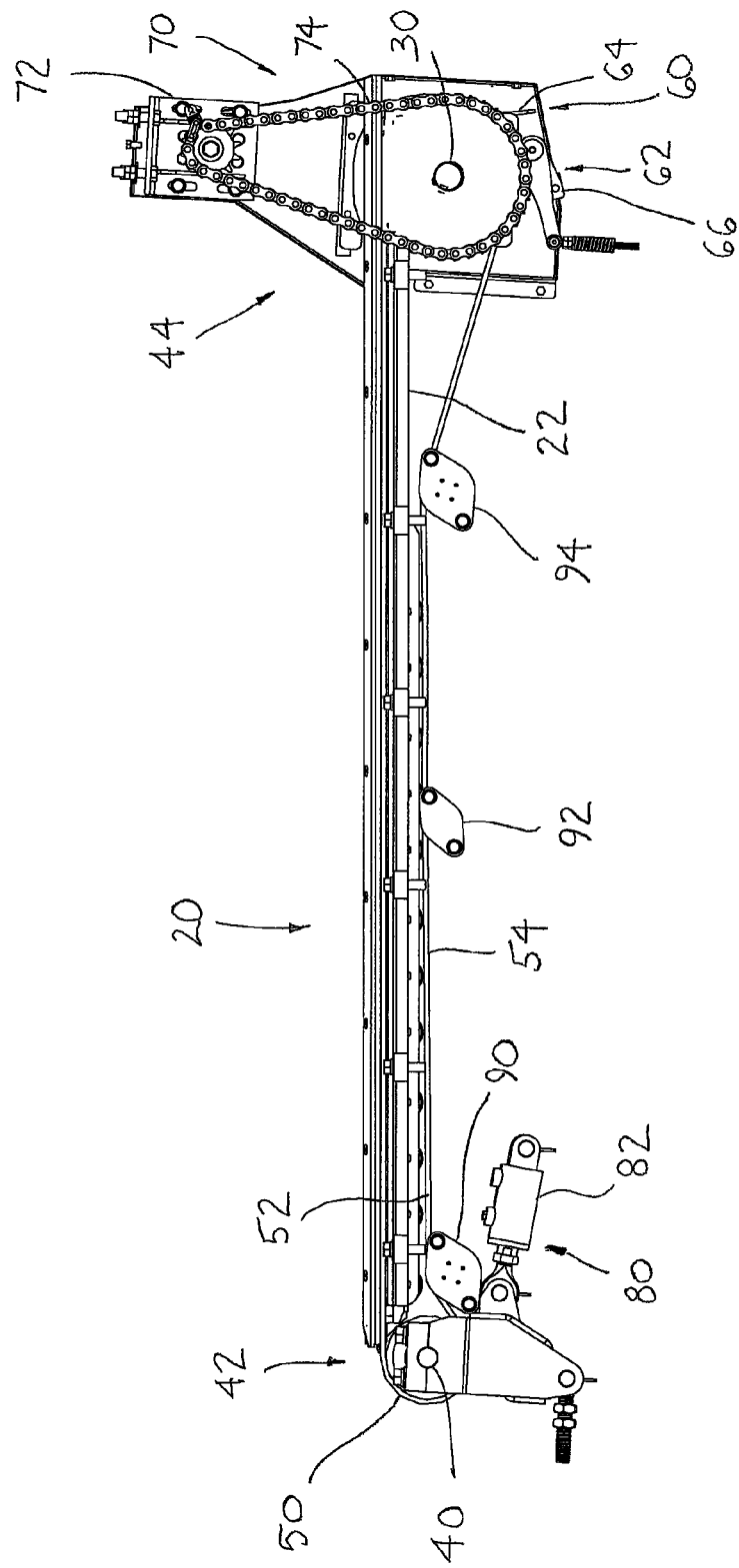
FIG. 1 is a side view of the preferred embodiment of the conveyor system in accordance with the present invention.

Referring now to the drawings, the preferred embodiments of the conveyor system in accordance with the present invention are illustrated by FIGS. 1 through 12. As shown in FIGS. 1 through 12, preferred embodiments of the claimed invention are adapted to provide an apparatus and method for a conveyor system adapted for use on an asphalt paver that will convey an entire load of asphaltic material and not pull back only a limited amount of asphaltic material. The preferred embodiments of the claimed invention are also adapted to provide an apparatus and method for a conveyor system that sufficiently reduces or eliminates carry-around asphaltic material. The preferred embodiments of the claimed invention are further adapted to provide an apparatus and method for a conveyor system that sufficiently reduces or eliminates asphaltic material build-up under the paver where the working components are located. Still further, the preferred embodiments of the claimed invention claimed are adapted to provide an apparatus and method for a conveyor system that sufficiently reduces or eliminates the premature failure of the mechanical, hydraulic and track components of an asphalt paver. In addition, the preferred embodiments of the claimed invention are adapted to provide an apparatus and method for a conveyor system that sufficiently reduces or eliminates the segregation of asphaltic material. The preferred embodiments of the claimed invention are also adapted to provide an apparatus and method for a conveyor system that is easy to clean and can be operated at reduced speeds. Further, the preferred embodiments of the claimed invention are adapted to provide an apparatus and method for a conveyor system that sufficiently reduces or eliminates wear on its components and sufficiently reduces the consumption of costly fuel.

Referring now to FIG. 1, a side view of the preferred embodiment of the conveyor system in accordance with the present invention is illustrated. As shown in FIG. 1, the preferred conveyor system adapted for use on an asphalt paver is designated generally by reference numeral 20. Preferred conveyor system 20 comprises conveyor system frame 22 (see also FIG. 3). The preferred conveyor system frame 22 comprises a low-friction material such as ultra-low friction UHMW (ultra high molecular weight polyethylene). The preferred frame 22 is removably mounted to an asphalt paver so that it may be easily removed from and replaced onto the paver. As a result, preferred conveyor system 20 may be easily repaired, maintained, serviced, and the like. While preferred conveyor system 20 is removably mounted to an asphalt paver, it is contemplated within the scope of the invention that the conveyor system may be fixedly mounted to asphalt paver. It is also contemplated within the scope of the invention that the frame may be of any suitable configuration and arrangement, including without limitation, the assembly of support rollers illustrated in FIGS. 8 and 9. Further, it is contemplated within the scope of the invention that the frame may be removably attached to an asphalt conveyor by any suitable fastening means such as nuts and bolts, tabs and slots, pins, and the like.

Figure 2:
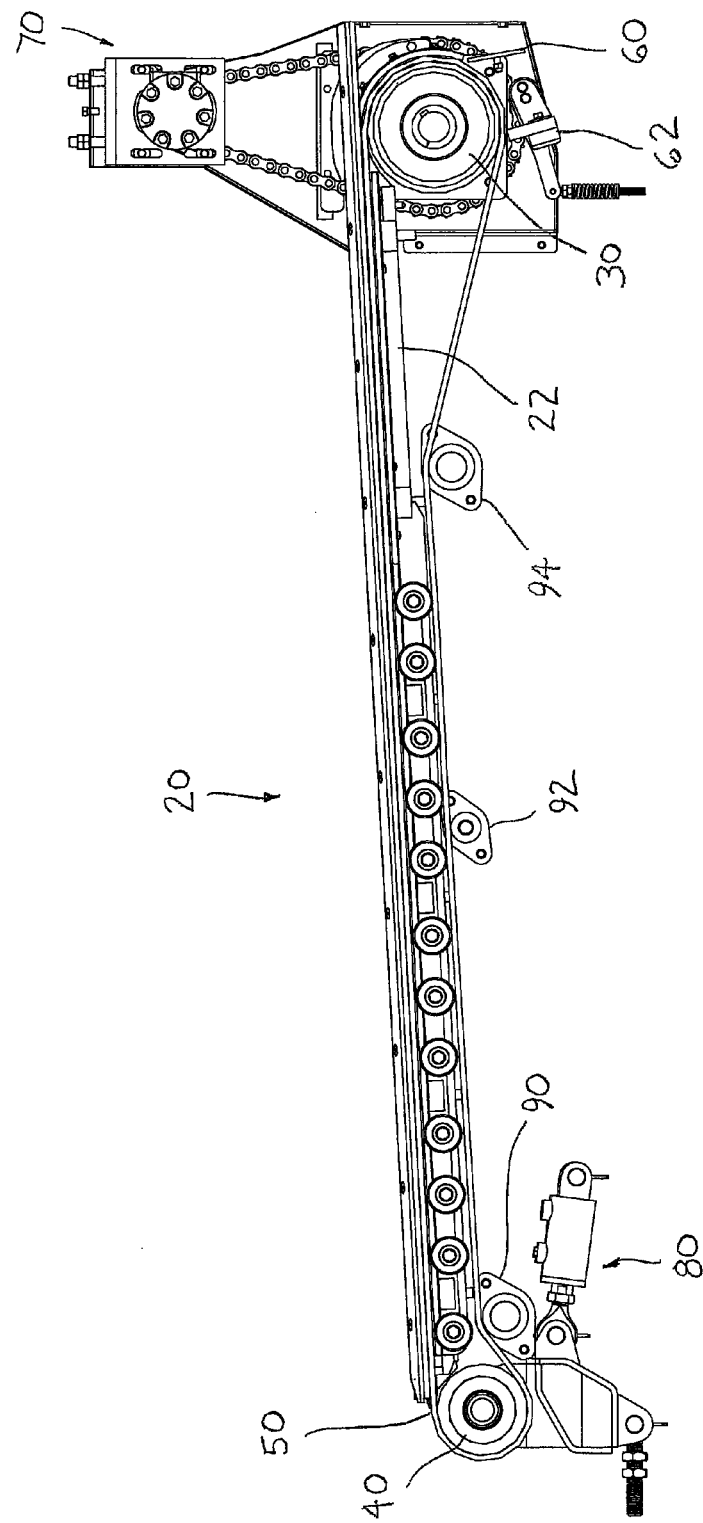
FIG. 2 is a partial sectional side view of the preferred conveyor system illustrated in FIG. 1.
Figure 3:
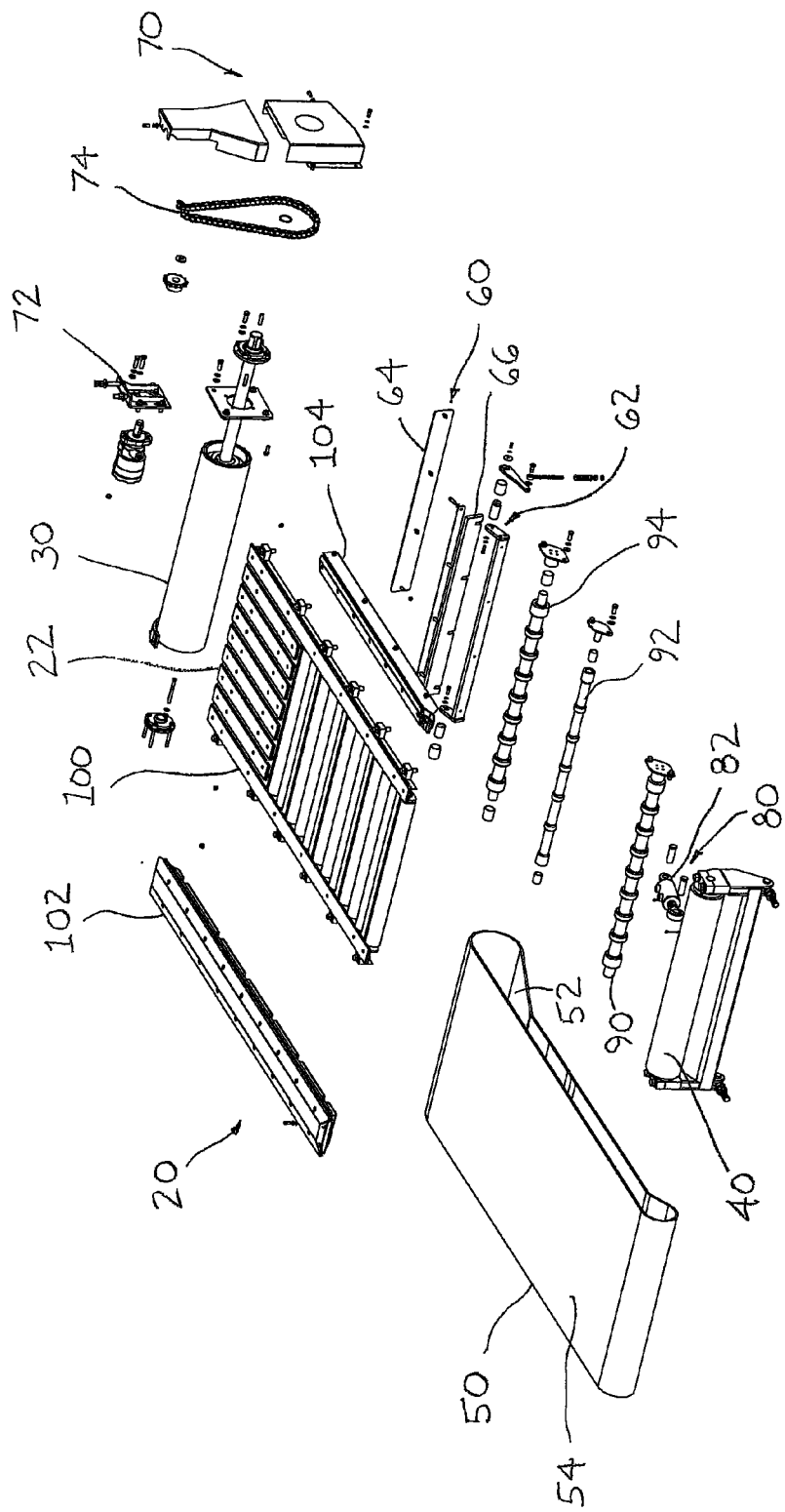
FIG. 3 is a perspective exploded view of the preferred conveyor system illustrated in FIGS. 1 and 2.

Still referring to FIG. 1, preferred conveyor system 20 also comprises first pulley 30 (see also FIGS. 2-3). Preferred first pulley 30 is rotatably mounted to conveyor system frame 22. Preferred first pulley 30 comprises a rubberized pulley, but it is contemplated within the scope of the invention that the first pulley may be a steel pulley or any other suitable type of pulley. Preferred conveyor system 20 further comprises second pulley 40 (see also FIGS. 2-3). Preferred second pulley 40 is rotatably mounted to conveyor system frame 22 and spaced apart from first pulley 30. Preferred second pulley 40 also comprises a rubberized pulley, but it is contemplated within the scope of the invention that the second pulley may be a steel pulley or any other suitable type of pulley. Preferred conveyor system 20 is adapted to convey asphaltic material between first area 42 adjacent to the second pulley and second area 44 adjacent to the first pulley.

Figure 4:
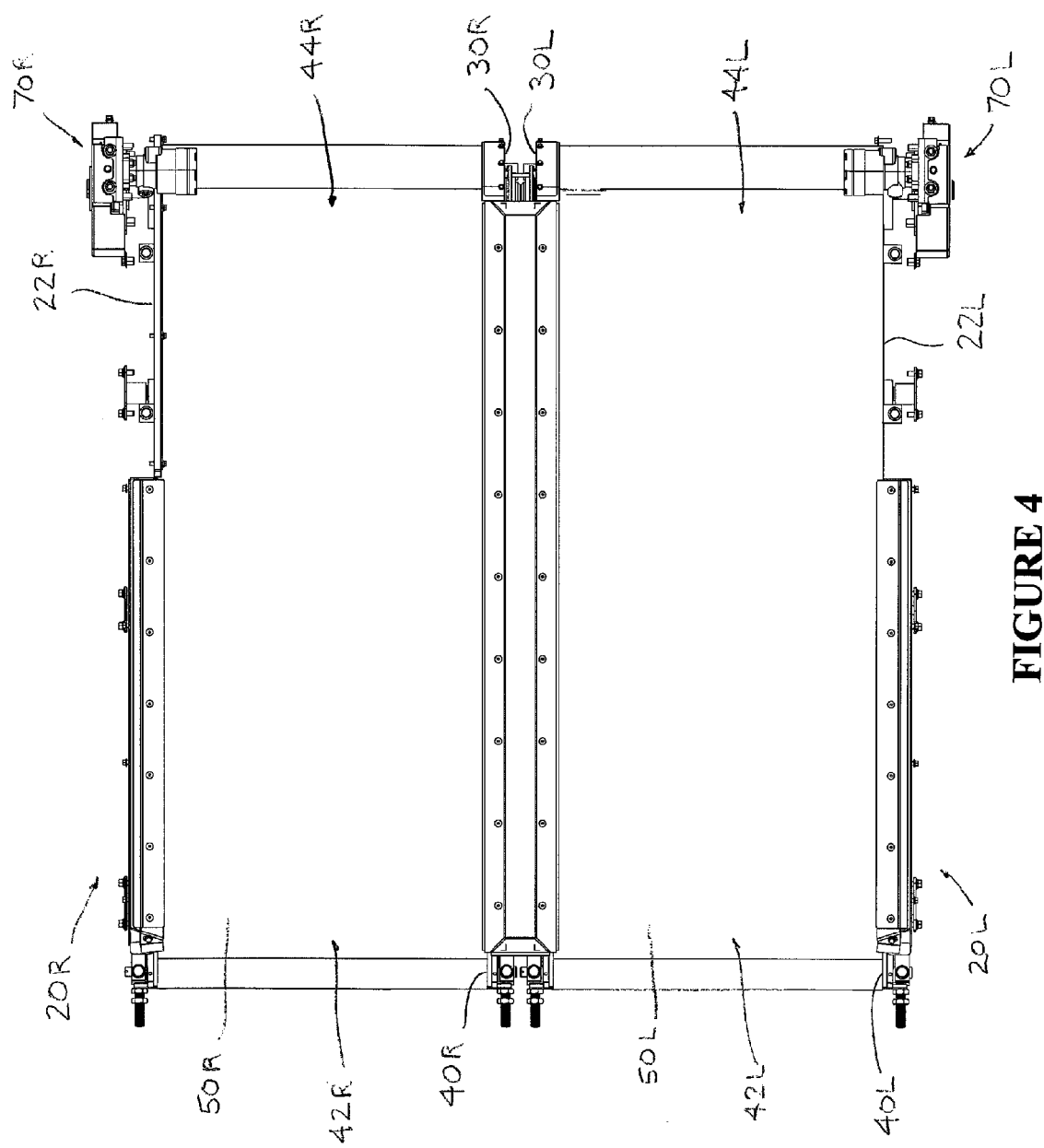
FIG. 4 is a top view of a pair of the preferred conveyor systems illustrated in FIGS. 1-3.

Still referring to FIG. 1, preferred conveyor system 20 comprises belt 50 (see also FIGS. 3-4). Preferred belt 50 comprises pulley-contacting surface 52 and asphalt-contacting surface 54 (see FIG. 3). Preferred belt 50 is disposed around first pulley 30 and second pulley 40. Preferred belt 50 comprises a rubber belt, but it is contemplated within the scope of the invention that the belt may be made from any suitable material or combination of materials. Preferably, belt 50 is joined by vulcanization at the seam, but it is also contemplated within the scope of the invention that the belt may be joined by any other suitable means such as splicing, jointing, hinging, pinning, hooking, riveting, stapling, clipping, lacing, and other mechanical fastening and welding techniques. One advantage of preferred removable conveyor frame 22 is that preferred belt 50 having a vulcanized joint can be easily slid onto first pulley 30 and second pulley 40. While FIG. 1 illustrates the preferred configuration and arrangement of the belt, it is contemplated within the scope of the invention that the belt may be of any suitable configuration and arrangement.

Still referring to FIG. 1, preferred conveyor system 20 comprises wipers 60 and 62. Preferred wipers 60 and 62 are adapted to remove asphaltic material from asphalt-contacting surface 54 of belt 50. Preferred wipers 60 and 62 comprise fixed plate 64 and spring-loaded plate 66 (see also FIGS. 2-3), but it is contemplated within the scope of the invention that the preferred wipers may comprise any suitable device, mechanism, assembly, or combination thereof adapted to remove residue asphaltic material from asphalt-contacting surface 54 of belt 50. As shown in FIG. 1, preferred wipers 60 and 62 are disposed adjacent to first pulley 30 in order to prevent residue asphaltic material from being carried around belt 50 to the underside of frame 22. While FIG. 1 illustrated the preferred configuration and arrangement of the wipers, it is contemplated within the scope of the invention that the wipers may be of any suitable configuration and arrangement adapted to remove residue asphaltic material from the asphalt-contacting surface of the belt. It is also contemplated within the scope of the invention that fewer or more than two wipers may be provided.

Still referring to FIG. 1, preferred conveyor system 20 also comprises means for rotating the first pulley 70. Preferred means for rotating the first pulley 70 is adapted to rotate first pulley 30. Preferred means for rotating the first pulley 70 comprises a pulley drive. The preferred pulley drive comprises motor 72 which is operably connected to first pulley 30 by chain 74 (see also FIGS. 2-3). While FIG. 1 illustrates the preferred configuration and arrangement of the means for rotating the first pulley, it is contemplated within the scope of the invention that the means for rotating the first pulley may be of any suitable configuration and arrangement adapted to rotate the first pulley such as an engine, a generator, a pump, an actuator, and the like. It is also contemplated within the scope of the invention that the means for rotating the first pulley may be operatively connected to the second pulley, or in the alternative, to the first pulley and the second pulley. It is still further contemplated within the scope of the invention that more than one means for rotating the pulleys may be provided.

Still referring to FIG. 1, preferred conveyor system 20 also comprises tensioning means 80. Preferred tensioning means 80 is adapted to increase, decrease, and maintain the tension in belt 50. As shown in FIG. 1, preferred tensioning means comprises hydraulic cylinder 82. It is contemplated within the scope of the invention, however, that the tensioning means may comprise any suitable device, mechanism, assembly, or combination thereof adapted to increase, decrease, and/or maintain the tension in the belt such as a spring or an actuator. While FIG. 1 illustrates the tensioning means disposed adjacent to the second pulley, it is contemplated within the scope of the invention that the tensioning means may be disposed in any suitable location. Preferred conveyor system 20 further comprises a backbending means. The preferred backbending means is adapted to backbend belt 50. The preferred backbending means comprises backbending rollers 90, 92, and 94 which are preferably disposed below frame 22. While FIG. 1 illustrates the preferred configuration and arrangement of the backbending means, it is contemplated within the scope of the invention that the backbending means may be of any suitable configuration and arrangement adapted to alter the travel path of the belt. It is also contemplated within the scope of the invention that the backbending means may comprises fewer of more than three backbending rollers.

Referring now to FIG. 2, a partial sectional view of preferred conveyor system 20 is illustrated. As shown in FIG. 2, preferred conveyor system 20 comprises frame 22, first pulley 30, second pulley 40, belt 50, wipers 60 and 62, means for rotating the first pulley 70, tensioning means 80, and backbending rollers 90, 92, and 94.

Referring now to FIG. 3, a perspective exploded view of preferred conveyor system 20 is illustrated. As shown in FIG. 3, preferred conveyor system 20 comprises frame 22, first pulley 30, second pulley 40, belt 50 having pulley-contacting surface 52 and asphalt-contacting surface 54, wiper 60 comprising fixed plate 64 and wiper 62 comprising spring-loaded plate 66, means for rotating the first pulley 70 comprising motor 72 and chain 74, tensioning means 80 comprising hydraulic cylinder 82, and backbending rollers 90, 92, and 94. In addition, preferred conveyor system 20 comprises rubber flashing 100, flashing holder 102, and rubber wipe holder 104. Preferred rubber flashing 100, flashing holder 102, and rubber wipe holder 104 are adapted to prevent belt 50 from moving transversely (side-to-side) relative to first pulley 30 and second pulley 40 and prevent asphaltic material from falling off the sides of the belt.

Referring now to FIG. 4, a top view of a pair of preferred conveyor systems 20 is illustrated. As shown in FIG. 4, the preferred conveyor systems are designated generally by reference numerals 20L and 20R. Preferred conveyor system 20L is disposed on the left side of an asphalt paver, and preferred conveyor system 20R is disposed on the right side of the asphalt paver. Each of preferred conveyor systems 20L and 20R is adapted to operate independently from each other at different times and/or different speeds. In addition, each of the preferred frames 22L and 22R are adapted to be easily and independently removed from and replaced onto the asphalt paver for convenient repair, maintenance, and the like. As shown in FIG. 4, preferred conveyor system 20L comprises left conveyor system frame 22L, left first pulley 30L, left second pulley 40L, left belt 50L, and left means for rotating the first pulley 70L. Preferred conveyor system 20R comprises right conveyor system frame 22R, right first pulley 30R, right second pulley 40R, right belt 50R, and right means for rotating the first pulley 70R. Each of the preferred belts 20L and 20R includes a pulley-contacting surface and an asphalt-contacting surface as shown in FIG. 3. In addition, each of the preferred conveyor systems 20L and 20R is adapted to convey asphaltic material between first areas 42L and 42R adjacent to the second pulley and second areas 44L and 44R adjacent to the first pulley, respectively.

Figure 5:
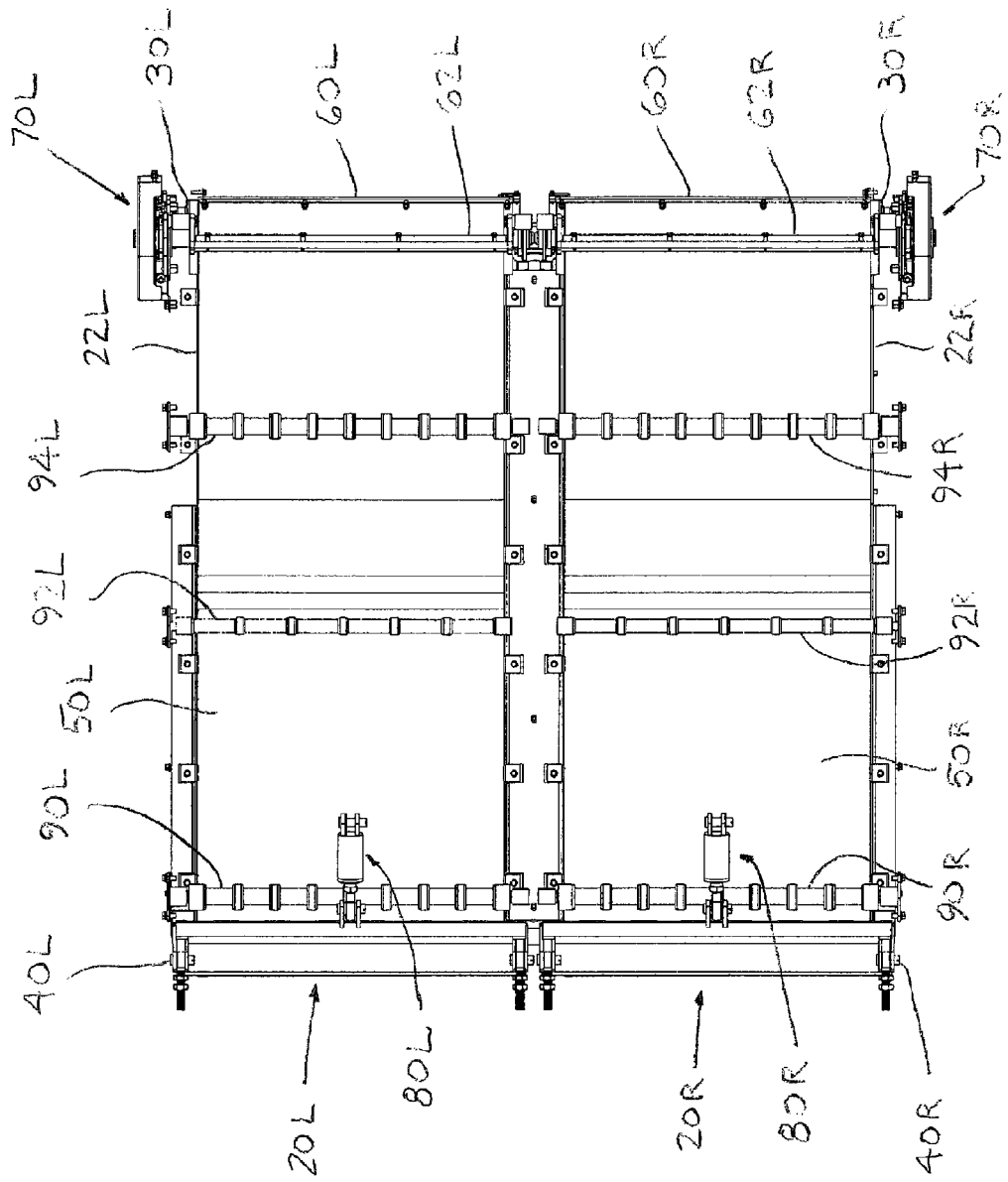
FIG. 5 is a bottom view of the preferred conveyor systems illustrated in FIG. 4.

Referring now to FIG. 5, a bottom view of preferred conveyor systems 20L and 20R is illustrated. As shown in FIG. 5, preferred conveyor systems 20L and 20R comprise a plurality of left wipers 60L and 62L, a plurality of right wipers 60R and 62R, left tensioning means 80L, right tensioning means 80R, left backbending rollers 90L, 92L, and 94L, and right backbending rollers 90R, 92R and 94R.

Figure 6:
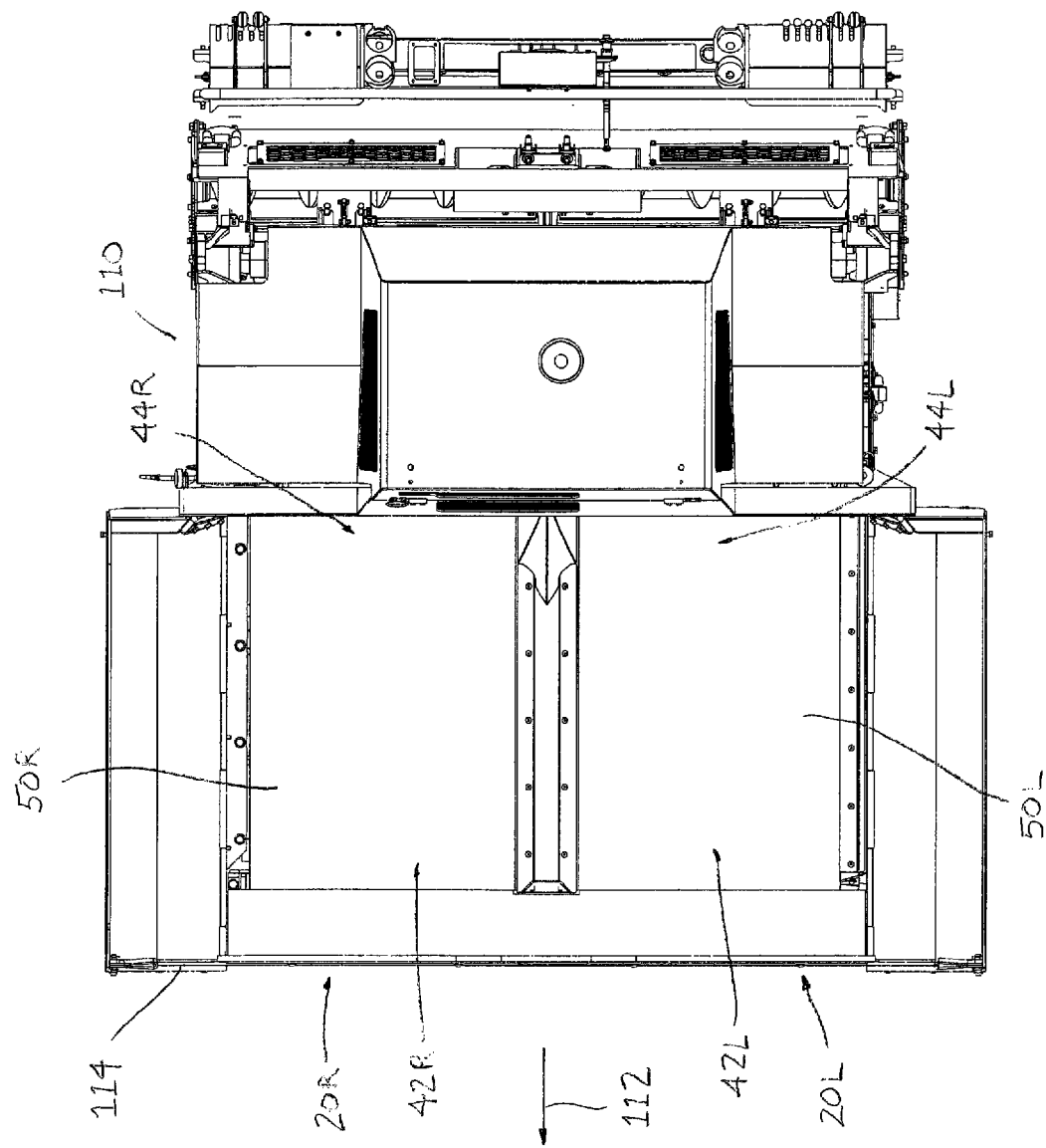
FIG. 6 is a top view of the preferred conveyor systems illustrated in FIGS. 1-5 disposed on an exemplary asphalt paver.

Referring now to FIG. 6, a top view of preferred conveyor systems 20L and 20R is illustrated. As shown in FIG. 6, preferred conveyor systems 20L and 20R are disposed in exemplary asphalt paver 110. The preferred direction of travel of exemplary asphalt paver 110 is indicated by arrow 112. When exemplary asphalt paver 110 is travelling in the direction indicated by arrow 112, asphaltic material may be dumped into hopper 114 and onto belts 50L and SOR from a truck or some other item of equipment travelling in front of the paver in the direction indicated by arrow 112. Each belt 50L and 50R is preferably adapted to convey an asphaltic material load dumped onto it from first areas 42L and 42R adjacent to the second pulleys to second areas 44L and 44R adjacent to the first pulleys, respectively. Together, belts SOL and 50R are preferably adapted to convey the entire load of asphaltic material dumped onto them in a direction substantially opposite the direction indicated by arrow 112. While FIG. 6 illustrates the preferred configuration and arrangement of the conveyor systems in an asphalt paver, it is contemplated within the scope of the invention that the conveyors systems may be configured and arranged in an asphalt paver in any suitable manner. It is also contemplated within the scope of the invention that the conveyor systems may convey asphaltic material in a direction that is substantially the same as or substantially transverse to the direction of travel of the asphalt paver. It is still further contemplated within the scope of the invention that fewer or more than two conveyor systems may be disposed in an asphalt paver.

Figure 7:
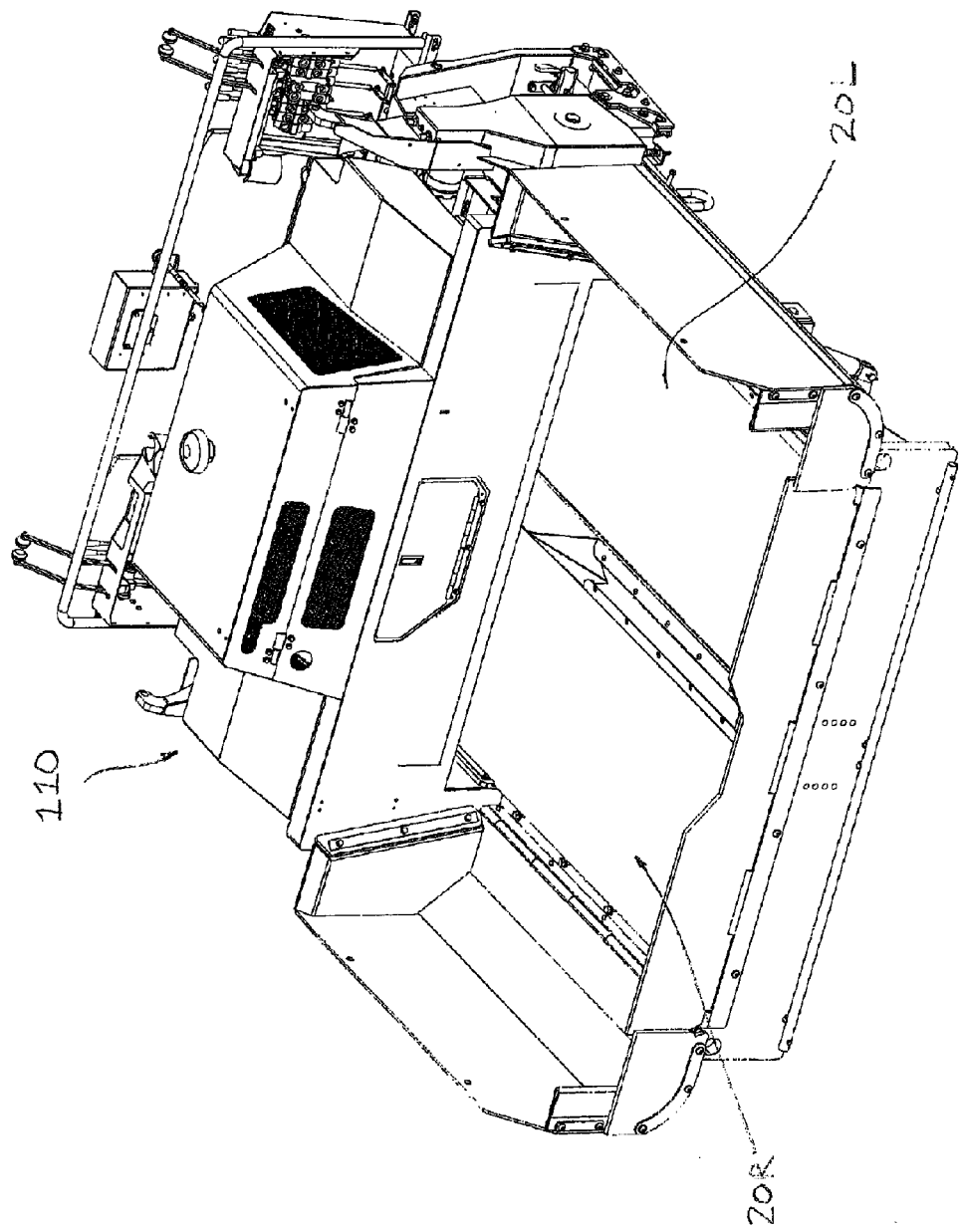
FIG. 7 is a perspective view of the preferred conveyor systems illustrated in FIGS. 1-6 disposed on an exemplary paver.

Referring now to FIG. 7, a perspective view of preferred conveyor system 20L and 20R is illustrated. As shown in FIG. 7, preferred conveyor systems 20L and 20R are disposed on exemplary paver 110.

Figure 8:
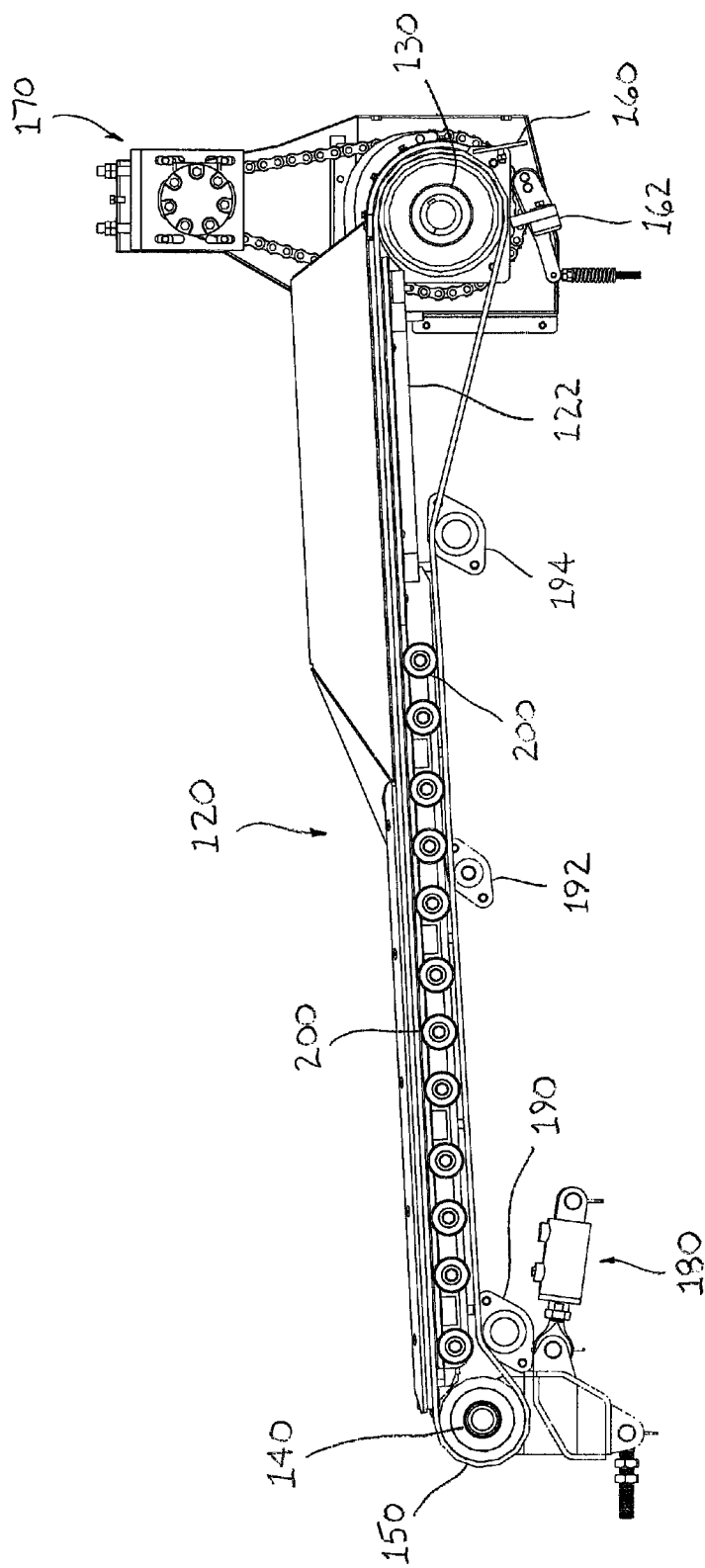
FIG. 8 is a side view of a first alternative embodiment of the conveyor system in accordance with the present invention.

Referring now to FIG. 8, a side view of a first alternative embodiment of the conveyor system in accordance with the present invention is illustrated. As shown in FIG. 8, the preferred conveyor system is designated generally by reference numeral 120. Preferred conveyor system 120 comprises conveyor system frame 122, first pulley 130, second pulley 140, belt 150, wipers 160 and 162, means for rotating the first pulley 170, tensioning means 180, and backbending rollers 190, 192, and 194. In addition, preferred conveyor system 120 comprises a plurality of support rollers 200. Preferred support rollers 200 are adapted to support at least a portion of the upper section of belt 150. While FIG. 8 illustrates the preferred configuration and arrangement of the conveyor system, it is contemplated within the scope of the invention that the conveyor system may be of any suitable configuration and arrangement. It is also contemplated within the scope of the invention that fewer or more than twelve (12) support rollers may be provided, and that more than one (1) conveyor system may be disposed on an asphalt paver.

Figure 9:
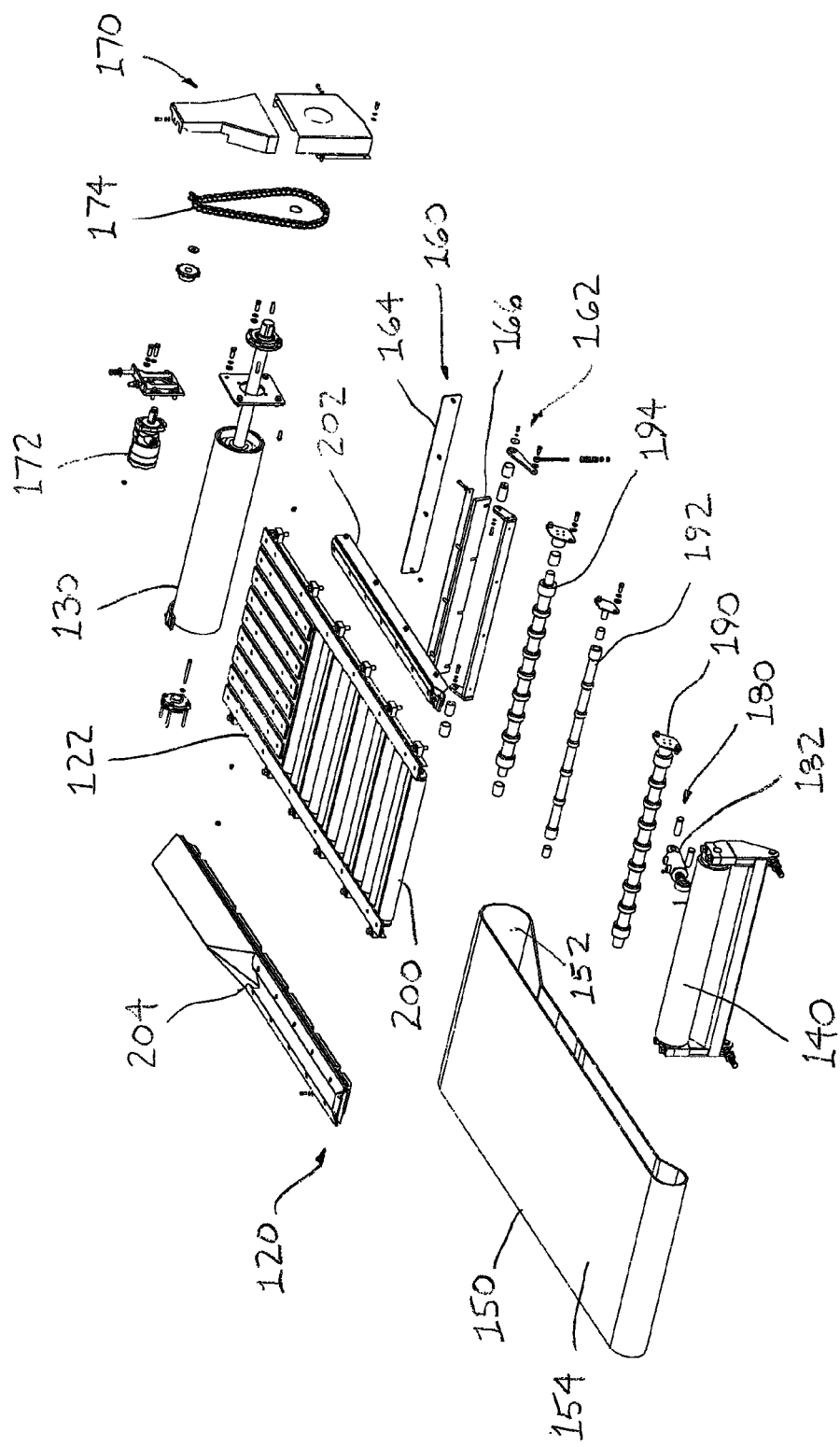
FIG. 9 is a perspective exploded view of the first alternative embodiment of the conveyor system illustrated in FIG. 8.

Referring now to FIG. 9, a perspective exploded view of preferred conveyor system 120 is illustrated. As shown in FIG. 9, preferred conveyor system 120 comprises frame 122, first pulley 130, second pulley 140, belt 150 having pulley-contacting surface 152 and asphalt-contacting surface 154, wiper 160 comprising fixed plate 164 and wiper 162 comprising spring-loaded plate 166, means for rotating the first pulley 170 comprising motor 172 and chain 174, tensioning means 180 comprising hydraulic cylinder 182, backbending rollers 190, 192, and 194, and support rollers 200. In addition, preferred conveyor system 120 comprises rubber flashing 202 and flashing holders 204. Preferred rubber flashing 202 and flashing holders 204 are adapted to prevent belt 150 from moving transversely (side-to-side) relative to first pulley 130 and second pulley 140.

Figure 10:
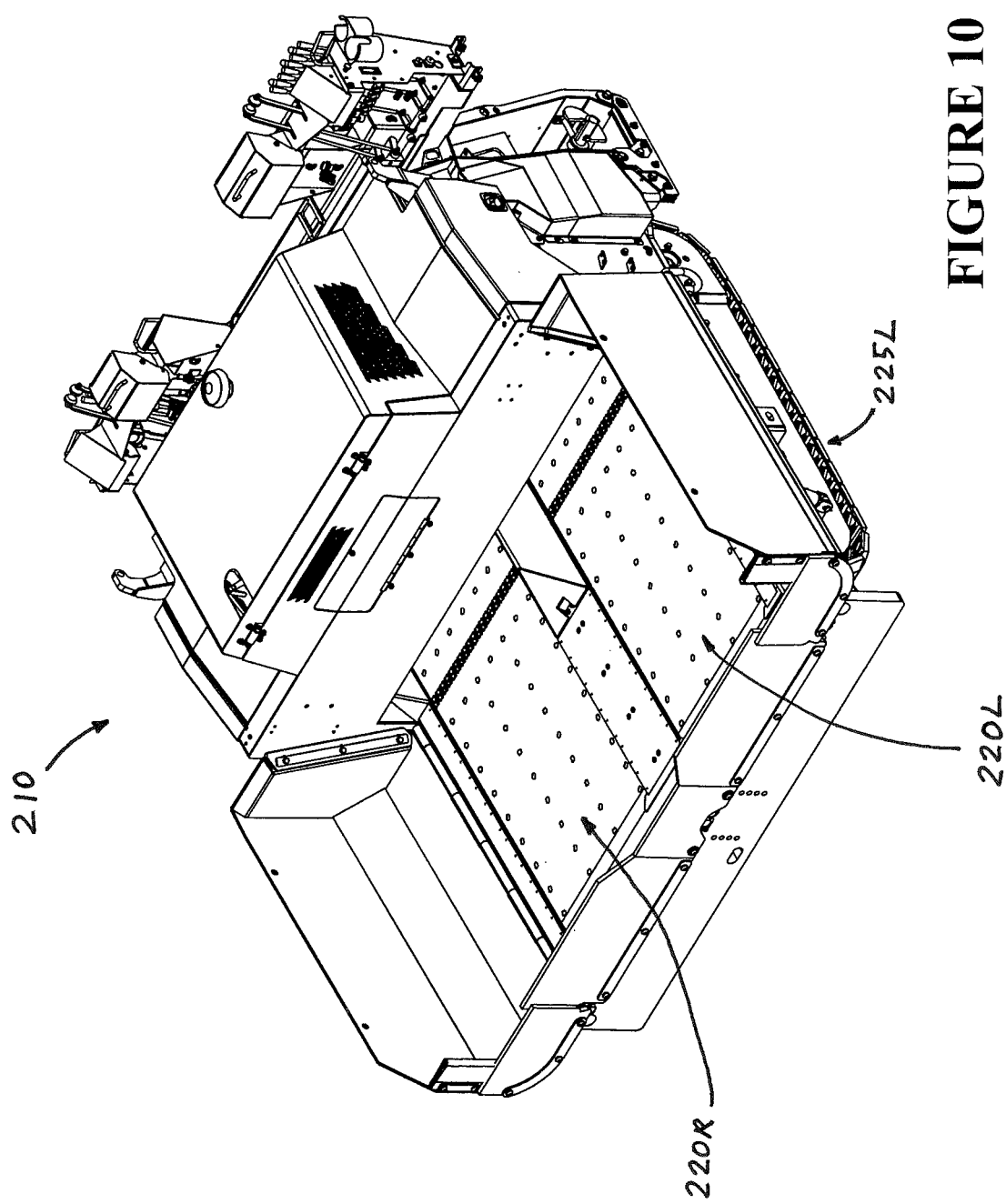
FIG. 10 is a perspective view of an exemplary embodiment of a paver with the conveyor system, showing the conveyor system in spatial relation to the tracks of the paver.

Referring now to FIG. 10, a perspective view of exemplary conveyor system 220L and 220R is illustrated. As shown in FIG. 10, exemplary conveyor systems 220L and 220R are disposed on exemplary paver 210.

Figure 11:
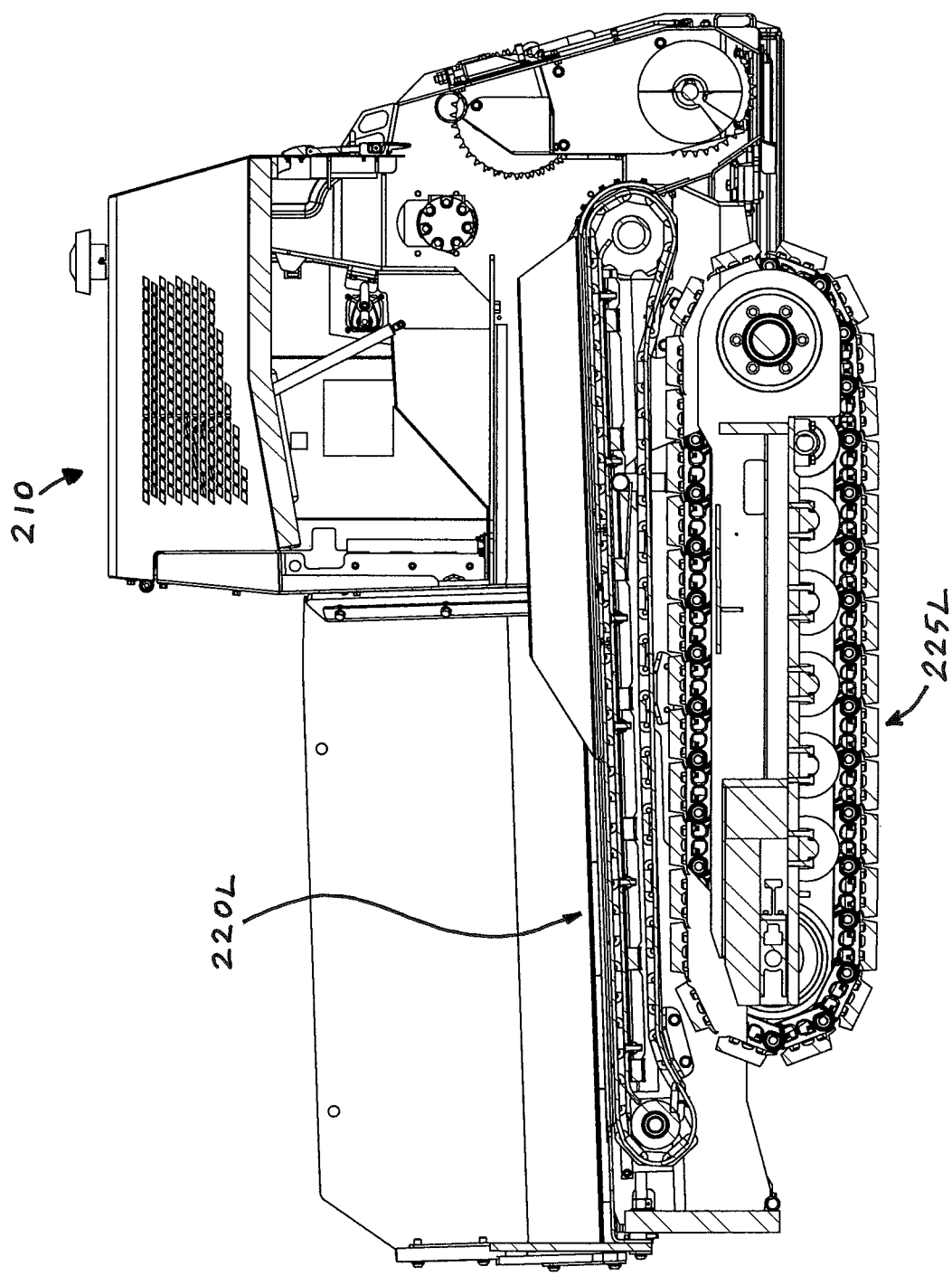
FIG. 11 is a left side section view of the exemplary embodiment illustrated in FIG. 10.

Referring now to FIG. 11, a left side section view of exemplary paver 210 is illustrated. As shown in FIG. 11, exemplary conveyor system 220L is disposed entirely above track 225L. It is also contemplated and within the scope of the present general inventive concept that, in some embodiments, an exemplary conveyor system is disposed substantially above the track.

Figure 12:
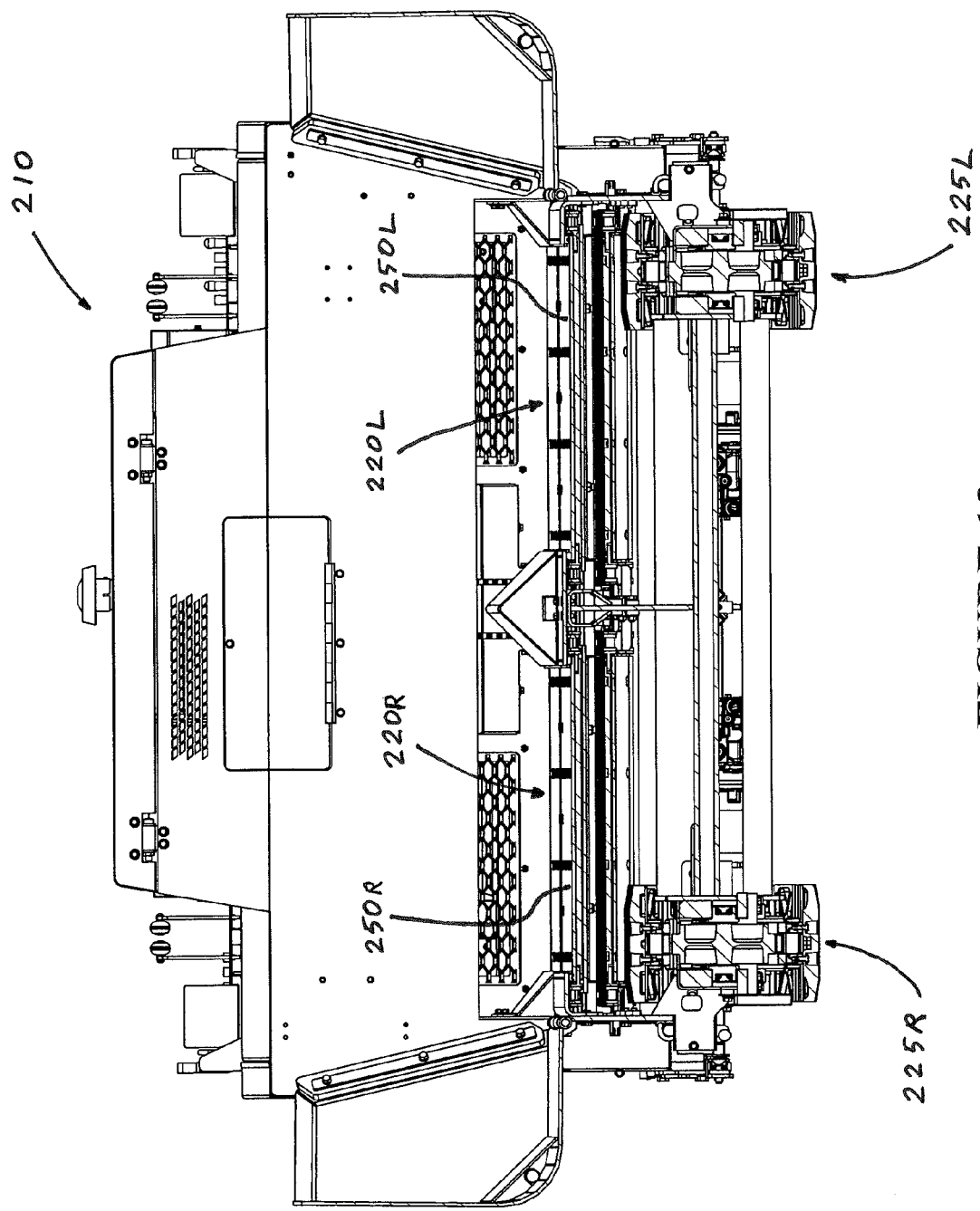
FIG. 12 is a front sectional view of the exemplary embodiment illustrated in FIGS. 10 and 11.

Referring now to FIG. 12, a front sectional view of exemplary paver 210 is illustrated. As shown in FIG. 12, exemplary conveyor systems 220L and 220R are disposed entirely above tracks 225L and 225R. Belt 250L associated with left conveyor system 220L has a width that extends laterally over a substantial portion of the width of the left track 225L of the paver 210. Similarly, belt 250R associated with right conveyor system 220R has a width that extends laterally over a substantial portion of the width of the right track 225R of the paver 210. Taken together, the belts 250L and 250R extend across substantially the entire width of the paver 210.

By having the belts extend across substantially the width of the underlying tracks, certain advantages are achieved. Because the belts are not located between the tracks (as in many prior art models), it is easier for users and technicians to access components of the conveyor systems, including the conveyor drive system, without any need to work around the tracks. Thus, the conveyor systems are easier to service and maintain than previous systems. Further, by having the belts extend across substantially the entire width of the paver, the conveyor systems are capable of moving a given volume of asphalt or other material with a lower RPM (or fewer total rotations) than in prior art systems, thereby reducing wear on all components of the conveyor systems. Alternatively, by having the belts extend across substantially the entire width of the paver, the conveyor systems are capable of moving more material at a given RPM compared to the prior art. Also, having conveyor systems with belts elevated so that they may extend across substantially the entire width of the paver provides more room beneath the conveyor systems for hydraulic lines, electrical lines, and other similar components, which are not as bunched together as in prior art systems. Additionally, having conveyor systems with belts extending across substantially the entire width of the paver generally results in less material being left in other non-conveyor parts of the paver, such as the hopper bed, the apron, and the conveyor covers, resulting in less shoveling and cleaning by a user to remove material left in other non-conveyor parts of the paver. Moreover, having conveyor systems with belts extending across substantially the entire width of the paver allows for material to flow more efficiently as compared to prior art systems, effecting more even flow of material to the screed and less reliance upon augers to move material. Overall, this achieves better, smoother material flow throughout the paving process, with less wear and stress on all components.

In preferred embodiments, the left means for rotating the left first pulley and the right means for rotating the right first pulley operate independently of one another, so that the left belt is capable of operating at a different speed than the right belt when both belts are in operation, whereby one belt is capable of being in operation when the other belt is not in operation. The left belt and the right belt are designed for independent operation. This is accomplished by having a left means for rotating the left first pulley and a right means for rotating the right first pulley, with the two means for rotating operating independently of one another. The two belts are thereby able to operate at different speeds (for example, when applying different thicknesses of material to a road and a shoulder), and one belt is capable of continuing to operate even when the other belt is being serviced or is otherwise not in operation for any reason.

The preferred embodiments of the invention claimed herein also comprise a method for conveying asphaltic material in an asphalt paver. The preferred method comprises providing a conveyor system adapted for use on an asphalt paver. The preferred conveyor system comprises a conveyor system frame, a first pulley that is rotatably mounted to the conveyor system frame, a second pulley that is rotatably mounted to the conveyor system frame and spaced apart from the first pulley, and a belt having a pulley-contacting surface and an asphalt-contacting surface and being disposed around the first pulley and the second pulley. The preferred conveyor system also comprises a wiper that is adapted to remove asphaltic material from the asphalt-contacting surface of the belt, and a means for rotating the first pulley that is adapted to rotate the first pulley. The preferred conveyor system is adapted to convey asphaltic material between a first area adjacent to the second pulley and a second area adjacent to the first pulley. The preferred method also comprises the steps of conveying asphaltic material between the first area adjacent to the second pulley and the second area adjacent to the first pulley, removing asphaltic material from the asphalt-contacting surface of the belt with the wiper, tensioning the belt with a tensioning means, and backbending the belt with a backbending means.

In operation, several advantages of the preferred embodiments of the claimed invention are achieved. For example, the preferred embodiments of the conveyor system provide a pair of conveyor systems adapted to operate independently at different times and/or at different speeds. The preferred embodiments of the conveyor system also provide conveyor frames that may be easily and independently removed from and replaced onto the asphalt paver for convenient repair, maintenance, and the like.

The preferred embodiments of the conveyor system also reduce or eliminate segregation of the asphaltic material which is a problem experienced by conventional flight bar conveyor systems. In conventional flight bar conveyor systems, the flight bar tends to initially pull larger asphaltic material from the pile of asphaltic material, and the finer asphaltic material remains near the top of the pile of asphaltic material. As a consequence, the asphalt mat laid down by a paver utilizing a conventional flight bar conveyor system does not include a uniform distribution of different-sized asphaltic materials. By contrast, the preferred embodiments of the conveyor system of the claimed invention are adapted to receive and convey a uniformly distributed load of asphaltic material without any segregation of the larger-sized asphaltic material from the smaller-sized asphaltic material. In addition, testing of the preferred embodiments of the conveyor system of the claimed invention has demonstrated that less horsepower is required to convey asphaltic material than is required with a conventional flight bar conveyor system. In fact, some test results demonstrated a 50% horsepower reduction in the preferred embodiments of the conveyor system of the claimed invention compared to conventional flight bar conveyor systems.

Further, the preferred embodiments of the conveyor system of the claimed invention reduce the amount of equipment clean-up required and improve the overall appearance of the asphalt paver. Still further, in the preferred embodiments of the conveyor system of the claimed invention, the wipers are adapted to clean substantially all, if not all, of the asphaltic material from the belt in order to prevent any asphaltic material from being carried under the frame. Because the preferred embodiments of the conveyor system of the claimed invention prevent asphaltic material from being carried around to the bottom side of the frame, asphaltic material is not dropped prior to paving operations or during transport.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A conveyor system adapted for use on an asphalt paver supported by left track and a right track, said conveyor system comprising:
   a. a left conveyor system frame;
   b. a left first pulley, said left first pulley being rotatably mounted to the left conveyor system frame;
   c. a left second pulley, said left second pulley being rotatably mounted to the left conveyor system frame and spaced apart from said left first pulley;
   d. a left belt, said left belt having a left belt pulley-contacting surface and a left belt asphalt-contacting surface, said left belt being disposed around said left first pulley and said left second pulley, said left belt being disposed substantially above the left track of the asphalt paver, said left belt having a width extending substantially over the width of the left track of the asphalt paver;
   e. a plurality of left wipers; said plurality of left wipers being adapted to remove asphaltic material from the left belt asphalt-contacting surface;
   f. a left means for rotating the left first pulley, said left means for rotating the left first pulley being adapted to rotate the left first pulley;
   g. a right conveyor system frame;
   h. a right first pulley, said right first pulley being rotatably mounted to the right conveyor system frame;
   i. a right second pulley, said right second pulley being rotatably mounted to the right conveyor system frame and spaced apart from said right first pulley;
   j. a right belt, said right belt having a right belt pulley-contacting surface and a right belt asphalt-contacting surface, said right belt being disposed around said right first pulley and said right second pulley, said right belt being disposed substantially above the right track of the asphalt paver, said right belt having a width extending substantially over the width of the right track of the asphalt paver;
k. a plurality of right wipers; said plurality of right wipers being adapted to remove asphaltic material from the right belt asphalt-contacting surface;
l. a right means for rotating the right first pulley, said right means for rotating the right first pulley being adapted to rotate the right first pulley;

wherein the conveyor system is adapted to convey asphaltic material between a first area adjacent to the left and right second pulleys and a second area adjacent to the left and right first pulleys, wherein the left belt and the right belt together extend across substantially the entire width of the paver, and wherein the left means for rotating the left first pulley and the right means for rotating the right first pulley operate independently of one another, whereby the left belt is capable of operating at a different speed than the right belt when both belts are in operation, and whereby one belt is capable of being in operation when the other belt is not in operation.

2. The conveyor system of claim 1 wherein at least one pulley comprises a rubberized pulley.

3. The conveyor system of claim 1 wherein at least one belt comprises a rubber belt.

4. The conveyor system of claim 1 wherein at least one belt is vulcanized.

5. The conveyor system of claim 1 wherein at least one wiper comprises a plate.

6. The conveyor system of claim 1 wherein at least one wiper comprises a spring.

7. The conveyor system of claim 1 wherein the left belt and the right belt are tensioned by tensioning means.

8. The conveyor system of claim 7 wherein the tensioning means comprises a spring.

9. The conveyor system of claim 7 wherein the tensioning means comprises an actuator.

10. The conveyor system of claim 1 wherein the belts are backbended by a backbending means.

11. The conveyor system of claim 10 wherein the backbending means comprises a backbending roller.

12. The conveyor system of claim 1 further comprising a plurality of support rollers.

13. A method for conveying asphaltic material in an asphalt paver, said method comprising:
a. providing an asphalt paver supported by left track and a right track;
b. providing a conveyor system adapted for use on an asphalt paver, said conveyor system comprising:
 (i) a left conveyor system frame;
 (ii) a left first pulley, said left first pulley being rotatably mounted to the left conveyor system frame;
 (iii) a left second pulley, said left second pulley being rotatably mounted to the left conveyor system frame and spaced apart from said left first pulley;
 (iv) a left belt, said left belt having a left belt pulley-contacting surface and a left-belt asphalt-contacting surface, and said left belt being disposed around said left first pulley and said left second pulley, said left belt being disposed substantially above the left track of the asphalt paver, said left belt having a width extending substantially over the width of the left track of the asphalt paver;
 (v) a plurality of left wipers; said plurality of left wipers being adapted to remove asphaltic material from the left belt asphalt-contacting surface;
 (vi) a left means for rotating the left first pulley, said left means for rotating the left first pulley being adapted to rotate the left first pulley;
 (vii) a right conveyor system frame;
 (viii) a right first pulley, said right first pulley being rotatably mounted to the right conveyor system frame;
 (ix) a right second pulley, said right second pulley being rotatably mounted to the right conveyor system frame and spaced apart from said right first pulley;
 (x) a right belt, said right belt having a right belt pulley-contacting surface and a right belt asphalt-contacting surface, and said right belt being disposed around said right first pulley and said right second pulley, said right belt being disposed substantially above the right track of the asphalt paver, said right belt having a width extending substantially over the width of the right track of the asphalt paver;
 (xi) a plurality of right wipers; said plurality of right wipers being adapted to remove asphaltic material from the right belt asphalt-contacting surface;
 (xii) a right means for rotating the right first pulley, said right means for rotating the right first pulley being adapted to rotate the right first pulley;
c. conveying asphaltic material between a first area adjacent to the left and right second pulleys and a second area adjacent to the left and right first pulleys.

14. The method of claim 13 wherein wherein the left belt and the right belt together extend across substantially the entire width of the paver.

15. The method of claim 13 wherein the left means for rotating the left first pulley and the right means for rotating the right first pulley operate independently of one another, whereby the left belt is capable of operating at a different speed than the right belt when both belts are in operation, and whereby one belt is capable of being in operation when the other belt is not in operation.

16. The method of claim 13 further comprising:
d. removing asphaltic material from the asphalt-contacting surface of the belt with the wiper.

17. The method of claim 13 further comprising:
d. tensioning the belt with a tensioning means.

18. The method of claim 13 further comprising:
d. backbending the belt with a backbending means.

* * * * *